(12) United States Patent
Regenor

(10) Patent No.: US 11,973,872 B2
(45) Date of Patent: Apr. 30, 2024

(54) DATA SECURITY SOLUTION USING RANDOMIZED 3-AXIS DATA SHAPES AND TOKENIZED DATA ELEMENT PLACEMENT OF ENCRYPTED AND NON-ENCRYPTED DATA

(71) Applicant: VeriTX Corp., Buffalo, NY (US)

(72) Inventor: James Allen Regenor, East Aurora, NY (US)

(73) Assignee: VeriTx Corp., Buffalo, NY (US)

( * ) Notice: Subject to any disclaimer, the term of this patent is extended or adjusted under 35 U.S.C. 154(b) by 277 days.

(21) Appl. No.: 17/722,904

(22) Filed: Apr. 18, 2022

(65) Prior Publication Data
US 2022/0337415 A1 Oct. 20, 2022

Related U.S. Application Data

(60) Provisional application No. 63/175,840, filed on Apr. 16, 2021.

(51) Int. Cl.
*H04L 29/06* (2006.01)
*H04L 9/08* (2006.01)
*H04L 9/32* (2006.01)

(52) U.S. Cl.
CPC .......... *H04L 9/3213* (2013.01); *H04L 9/0825* (2013.01); *H04L 9/3236* (2013.01)

(58) Field of Classification Search
CPC ... H04L 9/3213; H04L 9/0825; H04L 9/3236; H04L 9/3226; H04L 9/50; G09C 5/00
See application file for complete search history.

(56) References Cited

U.S. PATENT DOCUMENTS

| | | | | |
|---|---|---|---|---|
| 4,209,781 | A * | 6/1980 | Puri | G10L 19/00 |
| | | | | 341/127 |
| 11,422,805 | B1 * | 8/2022 | Kelly | G06F 7/766 |
| 2014/0245129 | A1 * | 8/2014 | Sapul | G06F 40/174 |
| | | | | 715/234 |
| 2015/0294581 | A1 * | 10/2015 | Kullok | A61B 5/743 |
| | | | | 434/362 |
| 2018/0012329 | A1 * | 1/2018 | Dunham | G06T 1/0021 |
| 2019/0087813 | A1 * | 3/2019 | Wilson | G06Q 20/3563 |
| 2021/0180126 | A1 * | 6/2021 | Kapanidis | C12Q 1/6874 |
| 2022/0337415 | A1 * | 10/2022 | Regenor | G09C 5/00 |

* cited by examiner

*Primary Examiner* — Mahfuzur Rahman
(74) *Attorney, Agent, or Firm* — Woods Oviatt Gilman LLP; Katherine H. McGuire, Esq.

(57) ABSTRACT

A method is provided to leverage blockchain based data tokenization to randomly tokenize encrypted and nonencrypted data elements within a data set represented in a 3-dimensional form, wherein the tokens are distributed and reordered into the correct position using a key pair match and Verifiable Self Sovereign Identification (VSSI). The key pair and VSSI credentials must be presented in order to distribute the tokenized data elements into the correct 3-dimensional position within the data set upon verification of the match of the key pair and the prescribed VSSI.

4 Claims, 2 Drawing Sheets

DATA SECURITY SOLUTION USING RANDOMIZED 3-AXIS DATA SHAPES AND TOKENIZED DATA ELEMENT PLACEMENT OF ENCRYPTED AND NON-ENCRYPTED DATA

CROSS REFERENCE TO RELATED APPLICATIONS

The present application claims the benefit of priority to U.S. Provisional Patent No. 63/175,840, filed on Apr. 16, 2021 and entitled Data Encryption Using Randomized 3-Axis Tokenized Data Placement Encryption Reordered With Verifiable Self Sovereign Identification And Key Pairs, the entirety of which is hereby incorporated by reference.

FIELD OF THE INVENTION

The present invention relates to systems and methods to leverage blockchain based data tokenization to randomly tokenize data elements within a data set represented in a randomized 3-dimensional form.

BACKGROUND OF THE INVENTION

Data security is of utmost importance to individuals, organizations and governments operating in a Web3 or other digital environment. To date, most digital security is based on maintaining security policies, privacy of usernames, and passwords. Should hackers breach username and password security measures, those hackers gain access to potentially all of the data files associated with that username account. Another approach, as set forth within the following disclosure, is to not only protect user identity and access, but also to provide for data security of the data sets by securing encrypted data files through randomized shapes of the data and tokenizing data elements such that any breach of the account does not result in capture of useful digital files.

BRIEF SUMMARY OF THE INVENTION

The present invention provides systems and methods to leverage blockchain-based data tokenization to randomly tokenize encrypted and nonencrypted data elements within a data set which is then structured into a randomized 3-dimensional form. The tokens are distributed and reordered into the correct position using a key pair match and Verifiable Self Sovereign Identification (VSSI). Both the key pair and VSSI credential must be presented in order to distribute the tokenized data elements into the correct position within the data set. As an added layer of security, the key pair and VSSI control the positioning of all the data elements by defining the position of a random centroid in an x, y, z tetrahedral 3-dimensional shape. That defined centroid's position allows all the data elements to assume the proper position for the data to be reordered for decrypting and use in the application.

A contextual practical use of this method is intended for the highest levels of classification and security requiring high levels of encryption and security as it is mathematically taxing on current computing solutions. This method serves as a mitigating solution to potential quantum computing hacks of data. Additionally, quantum computing will enable widespread applications to use this process.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will further be described, by way of example, with reference to the accompanying drawings.

DETAILED DESCRIPTION

Figure 1:
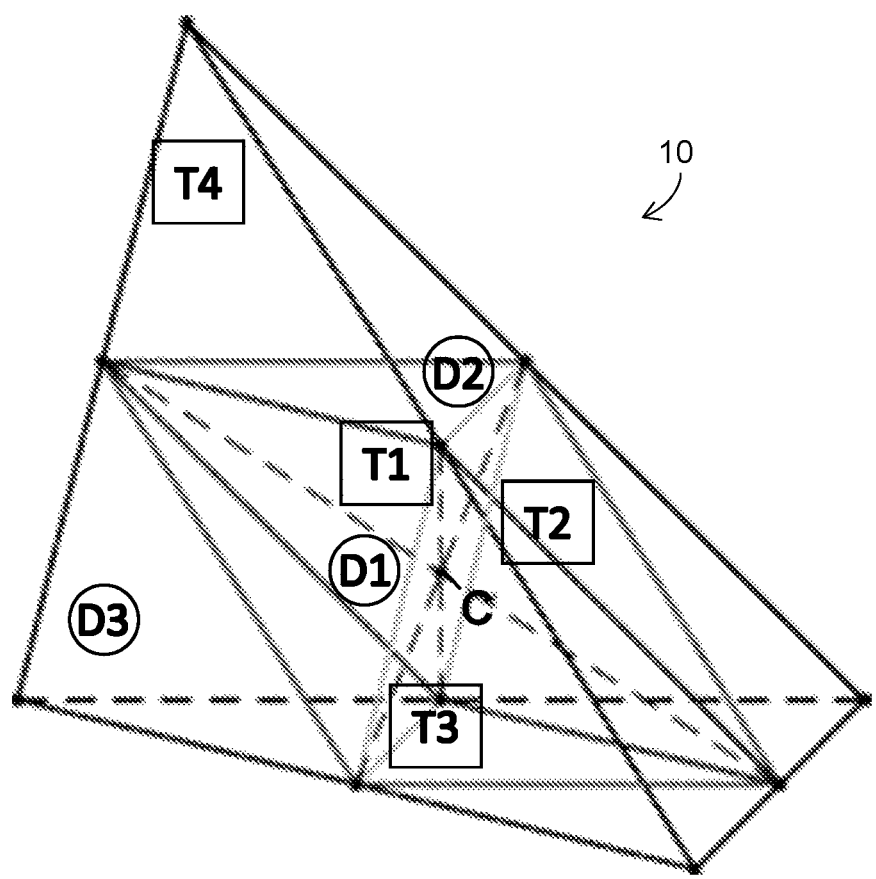
FIG. 1 is a graphic representation of an embodiment of the invention.

Referring to FIG. 1 there is provided a graphic representation of an example of a digital asset 10 where "1" represents tokenized digital assets and "D" represents data elements and "C" is the centroid of the represented 3 dimensional (3D) shape, such as an without limitation thereto, a tetrahedral. As will be set forth in more detail below, the 3D special coordinates of C (x, y, z) are randomized for each data set. The x, y, z coordinates of C are then tokenized and shared between prescribed Verifiable Self Sovereign Identification nodes (individuals, processes, or machines) within a blockchain enabled network. A second layer of information provided via key pairing is also affixes the coordinates to the centroid. As a result, data elements are tokenized and then randomized within the data set and can only be reordered via a correct and authorized VSSI and key pair match.

The two layers of security ensure that if the data encryption is compromised, the data still cannot be reordered to reveal the intended encrypted data set in the correct order without the proper VSSI match. Thus, the hacker will only see random streams of 1s and 0s with no prescribed order revealing the digital asset or intended use of the data, whether that data is a coded message or a digital asset/part.

Figure 2:
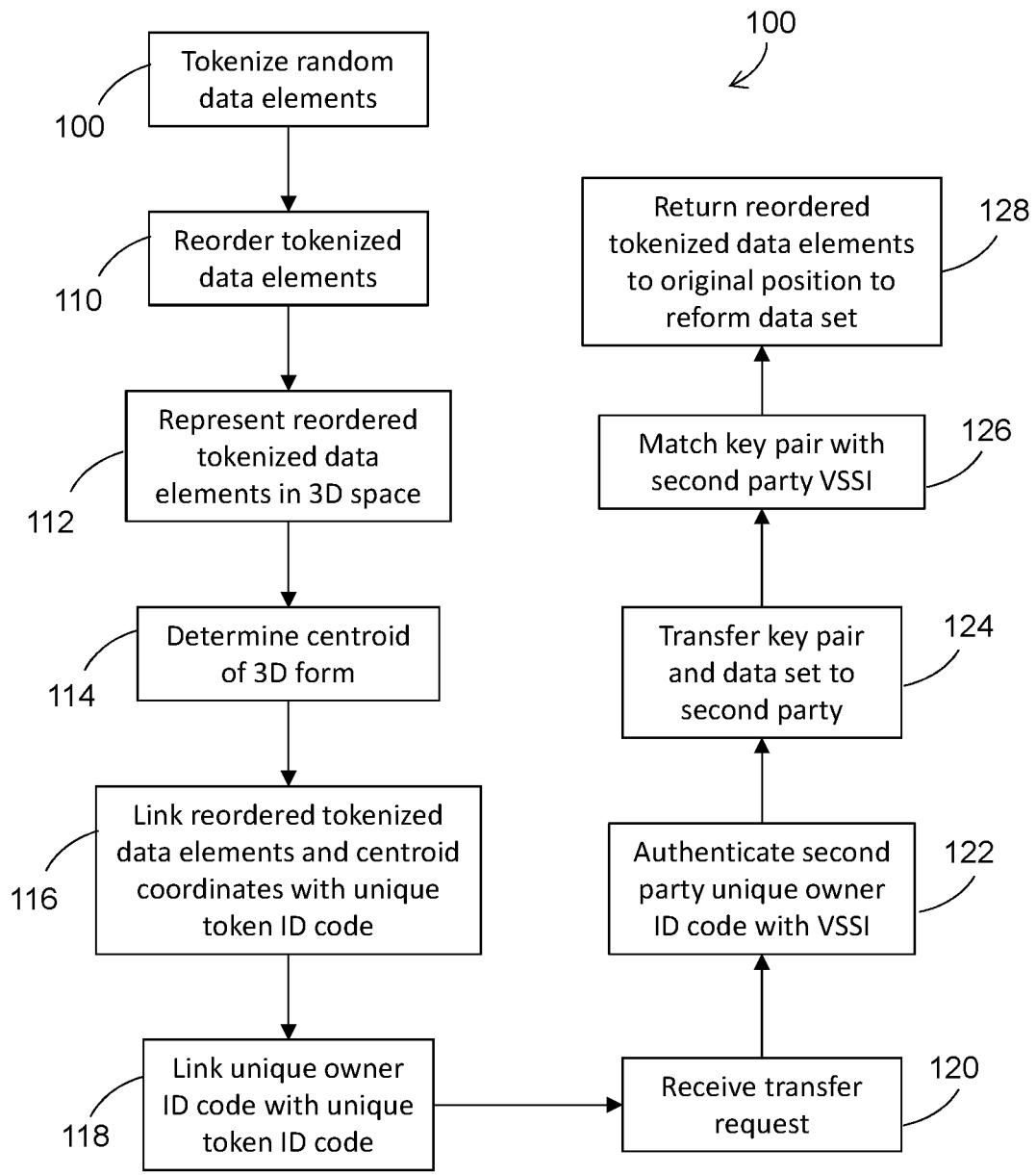
FIG. 2 is a flowchart showing an exemplary workflow algorithm for leveraging blockchain based data tokenization for encrypting a data set in accordance with an aspect of the present invention.

Turning now to FIG. 2, an exemplary algorithmic method 100 to leverage blockchain based data tokenization for securing an encrypted and/or non-encrypted data set is shown. Method 100 may be incorporated within processor-executable instructions stored in a memory and executable via a central processing unit (CPU), control logic circuit, or other module or device or network of devices, wherein the device may be, but is not limited thereto, one or more of a smart phone, smart watch, a tablet, laptop or desktop computer, or other similar devices. The computing device may further be operatively configured to communicate with a blockchain network through a wired or wireless connectivity wherein the blockchain network comprises an immutable public database.

In one non-limiting aspect of the present invention, method 100 begins at step 110 with tokenizing three or more random data elements within the data set. At step 112, the tokenized data elements are reordered from a correct position within the data set to a random position within the data set. The reordered tokenized data elements are then represented in a random 3-dimensional (3D) form at step 114, followed by determining centroid coordinates of the 3D form within 3D space at step 116. Step 118 then links the reordered tokenized data elements and centroid coordinates with a unique token identification (ID) code assigned to the data set. A unique owner ID code is then linked with the unique token ID code to create a key pair. The unique owner ID code may be authenticated by Verifiable Self Sovereign Identification (VSSI) and the random 3D form is a tetrahedral 3D shape having a centroid defined by x, y, and z coordinate space.

In a further aspect of the present invention, method 100 may include the further steps of receiving a transfer request from a second party, wherein the second party has a second unique owner ID code (step 120); authenticating the second unique owner ID code with Verifiable Self Sovereign Identification (VSSI) (step 122); transferring the key pair including all of the encrypted and/or non-encrypted data set including the reordered tokenized data elements and centroid coordinates to the second party (step 124); and matching the key pair to the authenticated second unique owner ID code (step 126), wherein the reordered tokens are distributed and returned to the correct position to reform the data set only if there is a confirmed key pair match with VSSI credentials for the second party (step 128).

Although the invention has been described with reference to preferred embodiments thereof, it is understood that various modifications may be made thereto without departing from the full spirit and scope of the invention as defined by the claims which follow.

What is claimed is:

1. A method to leverage blockchain based data tokenization for securing an encrypted and/or non-encrypted data set, the method comprising:
   a) tokenizing three or more random data elements within the data set;
   b) reordering the tokenized data elements from a correct position within the data set to a random position within the data set;
   c) representing the reordered tokenized data elements in a random 3-dimensional (3D) form;
   d) determining centroid coordinates of the 3D form within 3D space;
   e) linking the reordered tokenized data elements and centroid coordinates with a unique token identification (ID) code assigned to the data set;
   f) linking a unique owner ID code with the unique token ID code to create a key pair.

2. The method of claim 1 wherein the unique owner ID code is authenticated by Verifiable Self Sovereign Identification (VSSI).

3. The method of claim 1 further comprising:
   g) receiving a transfer request from a second party, wherein the second party has a second unique owner ID code;
   h) authenticating the second unique owner ID code with Verifiable Self Sovereign Identification (VSSI);
   i) transferring the key pair including all the of data encrypted and/or non-encrypted data set including the tokenized data elements and centroid coordinates to the second party;
   j) matching the key pair to the authenticated second unique owner ID code, wherein the reordered tokens are distributed and returned to the correct position to reform the data set only if there is a confirmed key pair match with VSSI credentials for the second party.

4. The method of claim 1 wherein the random 3D form is a tetrahedral 3D shape having a centroid defined by x, y, and z coordinate space.

* * * * *